(12) United States Patent
Ho et al.

(10) Patent No.: US 7,248,346 B2
(45) Date of Patent: Jul. 24, 2007

(54) APPARATUS FOR DEFINING ORIENTATION OF AN ALIGNMENT LAYER IN A PIXEL UNIT OF AN LCD DEVICE AND THE METHOD THEREOF

(75) Inventors: Yueh-Tun Ho, Hsinchu (TW); Chin-Hsiung Chang, Hsinchu (TW)

(73) Assignee: AU Optronics Corp., Hsinchu (TW)

( * ) Notice: Subject to any disclaimer, the term of this patent is extended or adjusted under 35 U.S.C. 154(b) by 333 days.

(21) Appl. No.: 10/960,079

(22) Filed: Oct. 8, 2004

(65) Prior Publication Data

US 2005/0252797 A1 Nov. 17, 2005

(30) Foreign Application Priority Data

May 11, 2004 (TW) ............................... 93113157 A

(51) Int. Cl.
*G01N 1/00* (2006.01)
(52) U.S. Cl. ...................................................... 356/36
(58) Field of Classification Search ................. 256/36; 356/36
See application file for complete search history.

(56) References Cited

U.S. PATENT DOCUMENTS 3,734,628 A * 5/1973 Michishita et al. ......... 356/431
4,225,228 A * 9/1980 DiMatteo ..................... 356/36
4,664,514 A * 5/1987 Corby, Jr. .................... 356/36
4,686,374 A * 8/1987 Liptay-Wagner et al. ..................... 250/559.46
5,777,743 A * 7/1998 Bacchi et al. ............... 356/370

OTHER PUBLICATIONS

Ishihara, S. "How far has the molecular alignment of liquid crystals been elucidated?" Journal of Display Technology 1.1 (2005): 30-40.*

* cited by examiner

*Primary Examiner*—Layla G. Lauchman
*Assistant Examiner*—Jonathan Skovholt
(74) *Attorney, Agent, or Firm*—Birch, Stewart, Kolasch & Birch, LLP

(57) ABSTRACT

An apparatus for determining orientation of an alignment layer in a pixel unit of an LCD device is provided. The pixel unit includes a glass substrate having an outer surface provided with the alignment layer treated by photolithographic masking and rubbing operation. The apparatus includes a conveyor belt for feeding the alignment layer; a steam-generating device disposed above the conveyor belt in such a maimer that the alignment layer is formed with a plurality of water drops or water layer when passed underneath the steam-generating device; a light source for providing light beams into the water drops on the alignment layer; and an image catcher for fetching an image data formed on the alignment layer by virtue of light reflection and refraction of the water drops hanging on the alignment layer.

6 Claims, 3 Drawing Sheets

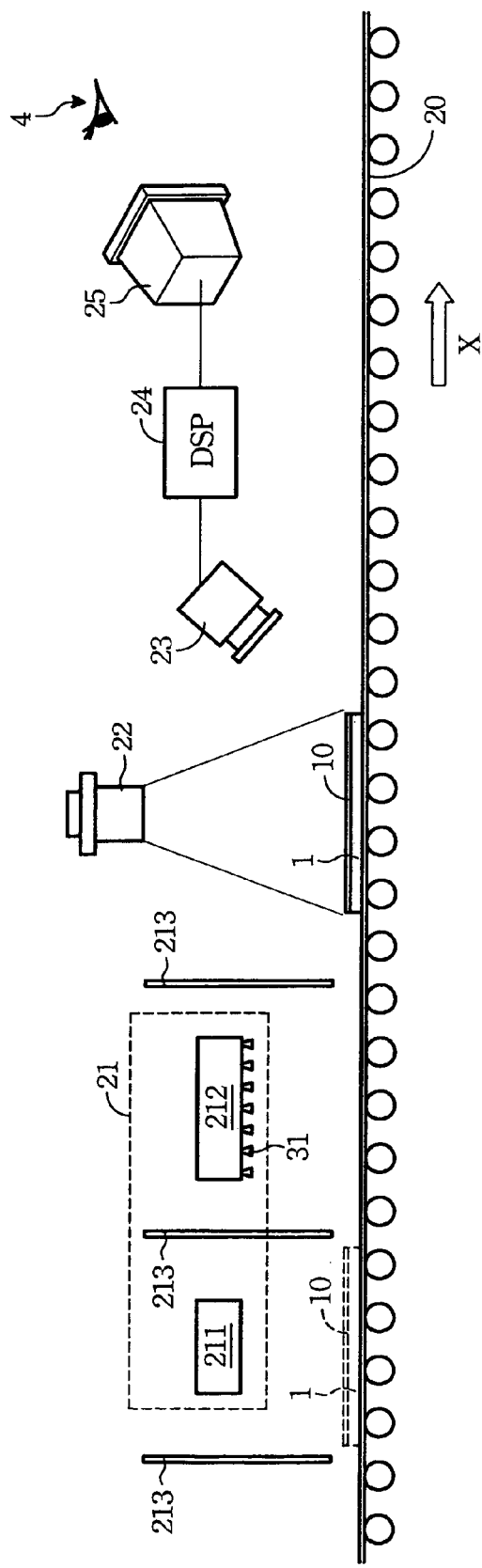
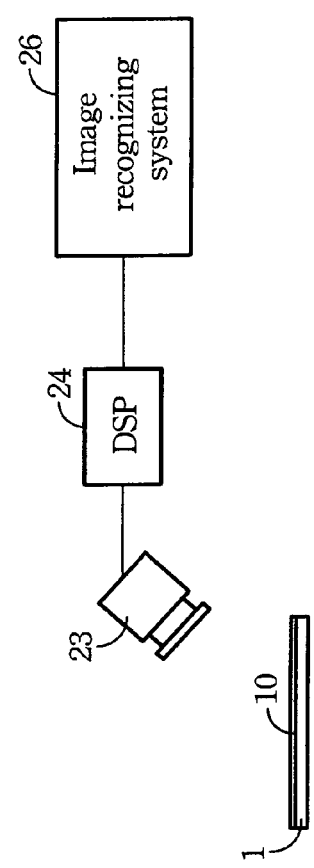
Fig.2A
Fig.2B

APPARATUS FOR DEFINING ORIENTATION OF AN ALIGNMENT LAYER IN A PIXEL UNIT OF AN LCD DEVICE AND THE METHOD THEREOF

This Non-provisional application claims priority under 35 U.S.C. § 119(a) on Patent Application No(s). 093113157 filed in Taiwan, Republic of China on May 11, 2004, the entire contents of which are hereby incorporated by reference.

FIELD OF THE INVENTION

The present invention generally relates to an apparatus for defining orientation, and more particularly to an apparatus for determining orientation of an alignment layer in a pixel unit of a liquid crystal display (LCD) device and the method thereof.

BACKGROUND OF THE INVENTION

In manufacturing an LCD device, liquid crystals are injected in a sealed space confined by two substrates to form a liquid crystal layer that generally permits light beams to pass therethrough in a normal state. The liquid crystals are normally in a liquid state rather than a solid state. Since they are very sensitive to heat, their orientation changes when an appropriate voltage is applied thereto so as to control light passage, thereby converting the liquid crystal layer into non-transparent or half-transparent state, which consequently results in an image display. Generally, an alignment layer is fabricated on the glass substrate by the photo printing technique in order to set the pre-tilt angles of the orientation of the liquid crystal molecules in the liquid crystal layer. The alignment layer can be made from natural polymer or artificial polymer (polymide), which may have to be treated in advance by photolithographic masking and rubbing operations in order to manipulate the orientation of nearby liquid crystal molecules. Prior to assembly, the substrate (with the alignment layer thereon) must undergo several testing and checking operations so that its defect can be found and/or the orientation of the substrate can be determined.

Typically, testing and checking operations of the glass substrate 1 are accomplished manually as shown in FIG. 1. The glass substrate 1 is held by one person, and is passed adjacent to a steam-generating device 31 in such a manner to form a plurality of water drops or water layer 32 on the alignment layer 10 by virtue of its initial low temperature. A light projector 22 is then used to direct light beams onto the alignment layer 10. In order to determine the orientation of the alignment layer 10 and/or find out the defects of the alignment layer 10, the reflection and refraction of light caused by the water drops hanging on the alignment layer 10 are observed by naked eyes of a tester 4 by changing several viewing angles with respect to the glass substrate 1.

Some drawbacks of the above testing method are as follow:

(ii) The resultant orientation of the alignment layer is not uniform because the procedure of determining orientation of the alignment layer is unduly depends on different personal experience and skills of an operator.

(iii) Several defected alignment layers must be discarded, thereby increasing the cost of manufacture.

SUMMARY OF THE INVENTION

One object of the present invention is to provide an apparatus for determining orientation of the alignment layer in a pixel unit of an LCD device and the method thereof so as to eliminate the disadvantages resulting from the use and construction of conventional LCD devices.

According to one aspect of the present invention, a method is provided for determining the orientation of an alignment layer in a pixel unit of an LCD device. The pixel unit includes a glass substrate having an outer surface provided with the alignment layer that has been treated by photolithographic masking and rubbing operations in order to manipulate the orientation of nearby liquid crystal molecules. The method accordingly includes the steps of: (i) permitting the alignment layer to pass through a high temperature region in order to condense pressure on the alignment layer, thereby forming a plurality of water drops or water layer on an outer surface of the alignment layer; (ii) providing light beams onto the alignment layer; (iii) fetching an image data formed on the alignment layer by virtue of light reflection and refraction of the water drops hanging on the alignment layer; and (iv) inspecting the image data to determine the orientation of the alignment layer.

In another aspect of the present invention, an apparatus is provided to define the orientation of an alignment layer in a pixel unit of an LCD device. The pixel unit includes a glass substrate having an outer surface provided with the alignment layer that has been treated by photolithographic masking and rubbing operation. The apparatus accordingly includes a conveyor belt for feeding the alignment layer; a steam-generating device disposed adjacent to and above the conveyor belt and including a cooling element adapted to lower temperature of the alignment layer in such a manner to form a plurality of water drops or water layer on an outer surface of the alignment layer, a humidity controller adapted to increase the temperature of the alignment layer in such a manner to form the water drops on the outer surface of the alignment layer, and at least two partitions disposed at opposite sides of the cooling element and cooperatively defining a cooling chamber facing a passing route of said conveyor belt; a light source for providing light beams into the water drops hanging on the alignment layer; and an image catcher for fetching an image data formed on the alignment layer by virtue of light reflection and refraction of the water drops on the alignment layer so as to define the orientation of the alignment layer.

BRIEF DESCRIPTION OF THE DRAWINGS

The foregoing aspects and many attendant advantages of the present invention will become more readily appreciated as the same becomes better understood by reference to the following detailed description, when taken in conjunction with the accompanying drawings, of which:

FIG. 2A shows the apparatus according to the present invention for determining the orientation of an alignment layer in a pixel unit of an LCD device;

FIG. 2B shows another apparatus according to the present invention for determining the orientation of an alignment layer in an LCD device;

DETAILED DESCRIPTION OF THE PREFERRED EMBODIMENTS

Figure 1:
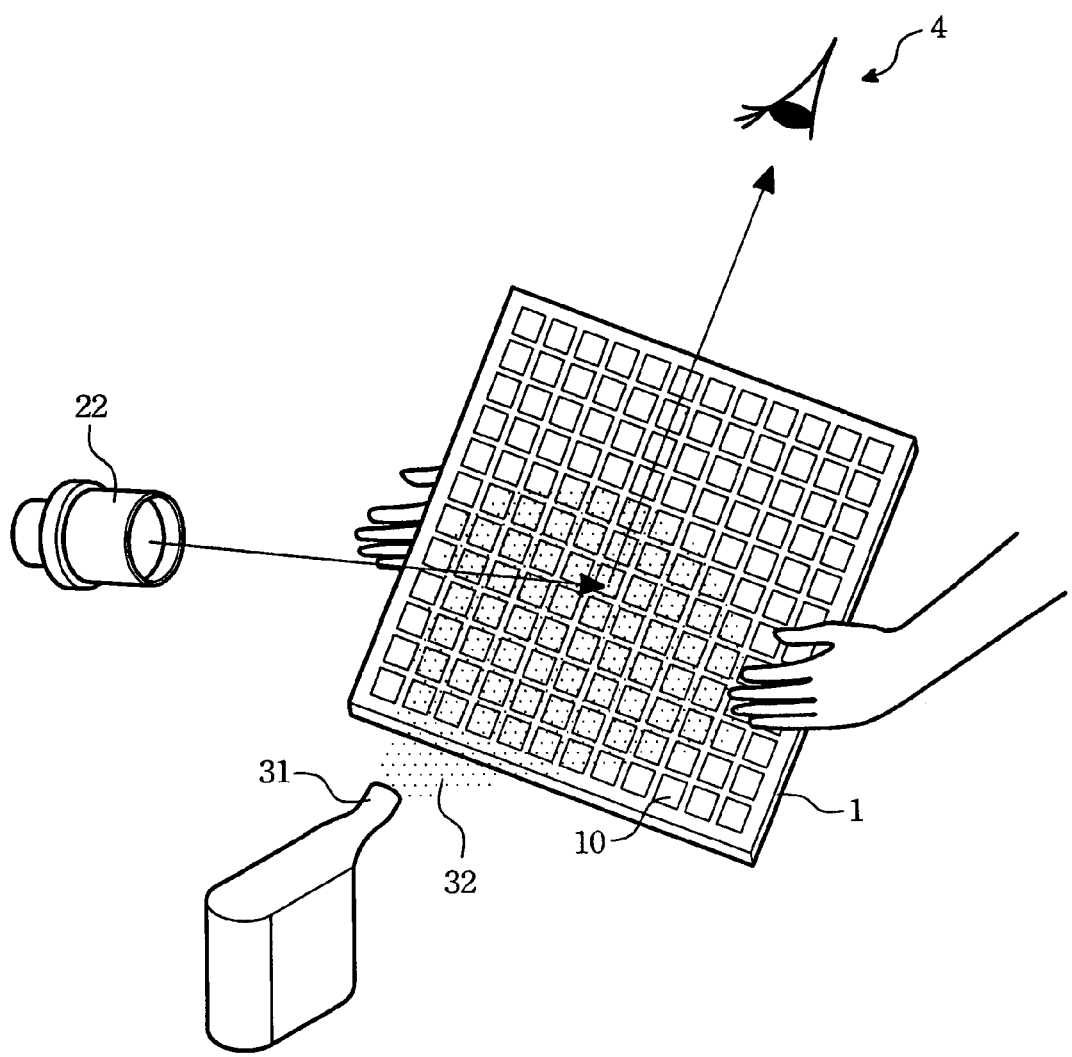
FIG. 1 is a schematic view, illustrating testing operation of the orientation of an alignment layer on the glass substrate of a pixel unit in an LCD device according to the conventional method.

It is noted that same reference numerals have been used to denote similar elements throughout the drawings and specification.

Referring to FIG. 2A, the preferred embodiment of an apparatus of the present invention is shown to include a conveyor belt 20, a steam-generating device 21, a light source 22 and an image catcher 23. The present apparatus is used for determining orientation of an alignment 10 in a pixel unit of an LCD device. The pixel unit generally includes two glass substrates 1 (only one is shown in FIG. 2A) and a liquid crystal layer (not shown) sandwiched therebetween. The alignment layer 10 is generally fabricated on the glass substrate 1, and has been treated by photolithographic masking and rubbing operations in order to manipulate the orientation of nearby liquid crystal molecules in the liquid crystal layer. Because fabrication of pixel units are well known in the art, a detailed description thereof is omitted herein for the sake of brevity.

The steam-generating device 21, the light source 22, and the image catcher 23 are disposed along a straight line. The conveyor belt 20 is disposed below the steam-generating device 21 for feeding the glass substrate 1 along a passing route (X) such that after passing underneath the steam-generating device 21, an outer surface of the alignment layer 10 is formed with a plurality of water drops or a water layer due to its initial lower temperature. The steam-generating device 21 includes a cooling element 211, which is adapted to lower the temperature of the alignment layer 10 in such a manner to form the water drops or the water layer on the alignment layer 10, and two partitions 213 disposed at opposite side of the cooling member 211. The partitions 213 cooperatively define a cooling chamber facing the passing route (X) of the conveyor belt 20. Alternatively, the steam-generating device 21 may include a humidity controller 212, which is adapted to increase the temperature of the alignment layer 10 in such a manner to form the water drops or the water layer on the alignment layer 10, and two partitions 213 disposed at opposite sides of the humidity controller 212. The partitions 213 cooperatively define a hot chamber facing the passing route (X) of the conveyor belt 20. Since the humidity escapes only toward the passing route (X) of the conveyor belts 20, the light source 22 and the image catcher 23 disposed at the ambient surrounding thereof are not affected by the density of the cooling element 211 or the humidity of the humidity controller 212. Preferably, the humidity controller 212 is further formed with a plurality of outwardly projecting spouts 31 for supply of steam onto the alignment layer 10, thereby forming the water drops on the alignment layer 10.

The light source 22, preferably a light projector, is disposed at a distance away from the steam-generating device 21, and projects light beams onto the alignment layer 10 as the latter travels forward. Under this condition, image data will be formed on the alignment layer 10 by virtue of light reflection and refraction of the water drops hanging on the outer surface of the alignment layer 10. The image catcher 23, being disposed adjacent to the light source 22, catches the image data reflected back from the alignment layer 10. The image catcher 23 can be charge-coupled devices (CCDs), which read the light beams and capture video or still images formed on the water drops or the water layer, and includes a digital signal processor (DSP) 24 which processes the images and shows the resultant data on a display monitor 25. Under this condition, the operator 4, viewing the monitor 25, can determine the orientation of the alignment layer 10.

FIG. 2B shows another preferred embodiment of the present invention to have the construction similar to the previous embodiment. In this preferred embodiment, the image catcher 23 includes an image recognizing system 26 that is coupled to the DSP 24. The DSP is stored with a reference table and is adapted to compare the image data fetched by the image catcher 23 with respect to the reference table so that any defect of the alignment layer 10 can be identified.

Figure 3A:
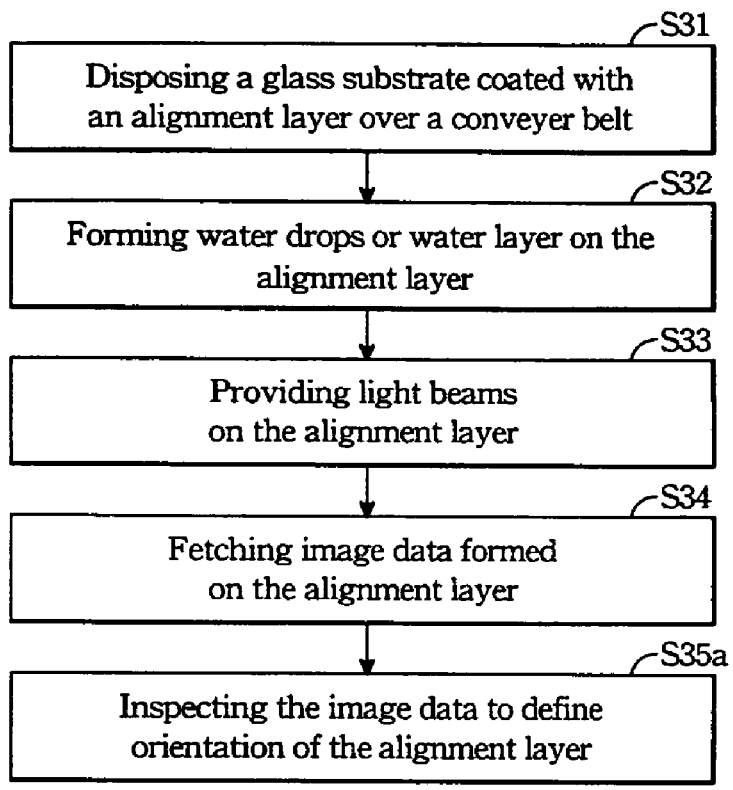
FIG. 3A is a block diagram, illustrating the steps for determining the orientation of the alignment layer in the LCD device according to one embodiment of present invention.

A method is provided according to the present invention for determining the orientation of the alignment layer 10 in a pixel unit of an LCD device, which includes the steps shown in FIG. 3A. At step 31, the glass substrate 1 coated with the alignment layer 10 is disposed on the conveyor belt 20, which travels along the route (X) so as to feed the glass substrate 1 to a position nearby the steam-generating device 21. Note that photolithographic masking and rubbing operations are conducted on the alignment layer 10 in order to manipulate the orientation of the nearby liquid crystal molecules in the liquid crystal layer of the LCD device. At step 32, after passing underneath the steam-generating device 21, the upper surface of the alignment layer 10 is formed with a plurality of water drops by virtue of its initial low temperature. At step 33, the light projector 22 is used to provide light beams onto the alignment layer 10 such that image data can be formed thereon due to reflection and refraction of light from the water drops. At step 34, the image data is fetched by the image catcher 23 that includes a digital signal processor 24 for processing the image data in such a manner to display the resultant data on the display monitor 25. At step 35a, the operator 4 determines the orientation of the alignment layer 10 on the basis of the resultant data.

Figure 3B:
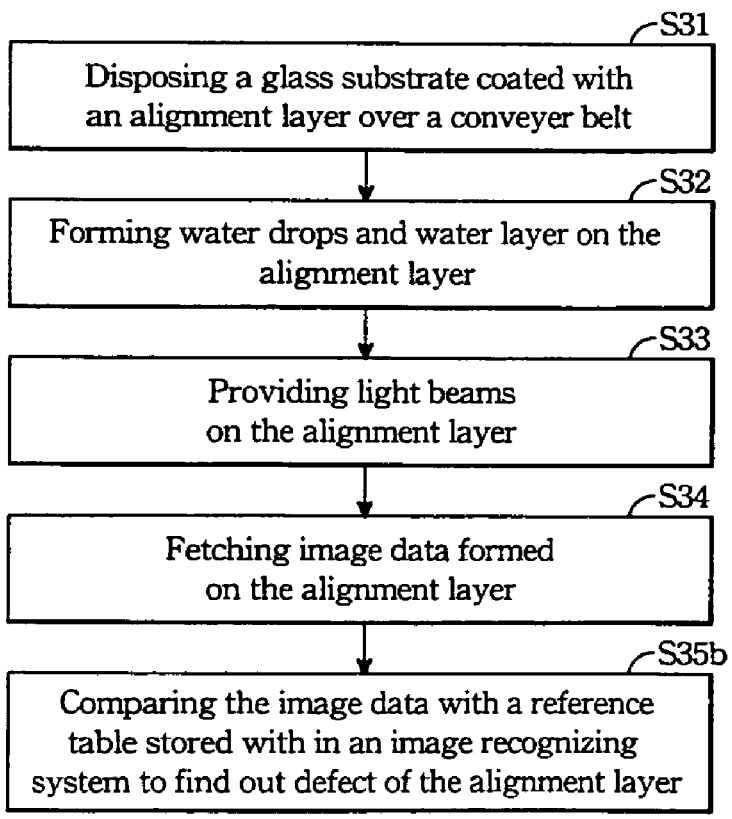
FIG. 3B is a block diagram, illustrating the steps for determinig the orientation of the alignment layer in the LCD device according to another embodiment of the present invention.

Another embodiment of the present invention is provided for determining the orientation (or to find out drawback) of the alignment layer 10 in a pixel unit of an LCD device, which includes the steps shown in FIG. 3B. At step 35b, the image catcher 23 includes an image recognizing system 26 that is stored with a reference table and that is adapted to compare the image data automatically with the reference table so as to provide a resultant data shown on the display.

The advantages provided by the apparatus and method according to the present invention for defining the orientation of the alignment layer in the pixel unit of the LCD device are as follows:

(i) the viewing angles for observing the image data provided by the water drops formed on the alignment layer are adjusted automatically and continuously so as to save the manpower, thereby providing an effective testing speed.

(ii) Since image recognizing system is used to compare the image data with the reference table stored therein and since human errors caused by the naked eyes of the operator can be eliminated, a precise orientation of the alignment layer can be achieved.

As understood by a person skilled in the art, the foregoing preferred embodiments of the present invention is of illustrative rather than limiting thereon. It is intended to cover various modifications and similar arrangements included within the spirit and scope of the appended claims, the scope of which should be accorded the broadest interpretation so as to encompass all such modifications and similar structure.

We claim:

1. A method for determining orientation of an alignment layer in a pixel unit of an LCD device, the pixel unit including a glass substrate having an outer surface provided with the alignment layer which has been treated by photo-lithographic masking and rubbing operations, the method comprising the steps of:
    (i) permitting the alignment layer to pass through a high temperature region, thereby forming a plurality of water drops or water layer on an outer surface of the alignment layer;
    (ii) providing light beams onto the alignment layer;
    (iii) fetching an image data formed on the alignment layer by virtue of light reflection and refraction of the water drops hanging on the alignment layer;
    (iv) inspecting the image data to determine the orientation of the alignment layer; and
    (v) providing the data to an operator.

2. The method according to claim 1, wherein said water drops forming operation in the step (i) is achieved by spraying a predetermined amount of steam onto the alignment layer.

3. A method for determining orientation of an alignment layer in a pixel unit of an LCD device, the pixel unit including a glass substrate having an outer surface provided with the alignment layer which has been treated by photo-lithographic masking and rubbing operations, the method comprising the steps of:
    (i) spraying a predetermined amount of steam onto the alignment layer, thereby forming a plurality of water drops or water layer on an outer surface of the alignment layer;
    (ii) providing light beams onto the alignment layer;
    (iii) fetching an image data formed on the alignment layer by virtue of light reflection and refraction of the water drops hanging on the alignment layer;
    (iv) inspecting the image data to determine the orientation of the alignment layer; and
    (v) providing the data to an operator.

4. An apparatus for determining orientation of an alignment layer in a pixel unit of an LCD device, the pixel unit including a glass substrate having an outer surface provided with the alignment layer which has been treated by photo-lithographic masking and rubbing operation, the apparatus comprising:
    a conveyor belt for feeding the alignment layer;
    a steam-generating device disposed adjacent to and above the conveyor belt, and including
    a cooling element adapted to lower temperature of the alignment layer in such a manner to form a plurality of water drops or water layer on an outer surface of the alignment layer,
    a humidity controller adapted to increase the temperature of the alignment layer in such a manner to form said plurality of water drops on the outer surface of the alignment layer, and
    at least two partitions disposed at opposite sides of said cooling element and cooperatively defining a cooling chamber facing a passing route of said conveyor belt;
    a light source for providing light beams into said water drops on the alignment layer; and
    an image catcher for fetching an image data formed on the alignment layer by virtue of light reflection and refraction of said water drops hanging on the alignment layer so as to determine the orientation of the alignment layer.

5. The apparatus according to claim 4, wherein said steam-generating device further includes at least two partitions disposed at opposite sides of said humidity controller and cooperatively defining a hot chamber facing said passing route of said conveyor belt.

6. The apparatus according to claim 5, wherein said humidity controller further includes a spout for supply of steam onto the alignment layer for forming said plurality of water drops.

* * * * *